US012753015B2

(12) United States Patent
Setterstrom et al.

(10) Patent No.: US 12,753,015 B2
(45) Date of Patent: Oct. 6, 2026

(54) WIRELESS EMERGENCY STOP SYSTEM FOR CARGO APPLICATIONS

(71) Applicant: Goodrich Corporation, Charlotte, NC (US)

(72) Inventors: Kevin Setterstrom, Jamestown, ND (US); Scott P. Harms, Ypsilanti, ND (US); Michael Reich, Jamestown, ND (US); Ryan C. Ring, Carrington, ND (US); Daniel Tweten, Jamestown, ND (US); Eduardo Vinado, Fort Pierce, FL (US)

(73) Assignee: GOODRICH CORPORATION, Charlotte, NC (US)

( * ) Notice: Subject to any disclaimer, the term of this patent is extended or adjusted under 35 U.S.C. 154(b) by 679 days.

(21) Appl. No.: 18/119,116

(22) Filed: Mar. 8, 2023

(65) Prior Publication Data

US 2024/0300747 A1 Sep. 12, 2024

(51) Int. Cl.

| | |
|---|---|
| ***B65G 43/00*** | (2006.01) |
| ***B64D 9/00*** | (2006.01) |
| ***G08C 17/02*** | (2006.01) |

(52) U.S. Cl.

CPC ............. *B65G 43/00* (2013.01); *B64D 9/003* (2013.01); *G08C 17/02* (2013.01); *B64D 9/00* (2013.01); *B64D 2009/006* (2013.01); *B65G 2207/40* (2013.01)

(58) Field of Classification Search

CPC .... B65G 43/00; B65G 2207/40; B64D 9/003; B64D 9/00; B64D 2009/006; G08C 17/02

See application file for complete search history.

(56) References Cited

U.S. PATENT DOCUMENTS

| | | | | |
|---|---|---|---|---|
| 4,935,863 A * | 6/1990 | Calvas | G05B 19/058 | 700/169 |
| 5,046,690 A * | 9/1991 | Nordstrom | B64C 1/22 | 198/841 |
| 2007/0288674 A1* | 12/2007 | Ikeno | G05B 19/058 | 710/110 |
| 2018/0141751 A1* | 5/2018 | Muranaka | G05D 1/0223 | |

(Continued)

FOREIGN PATENT DOCUMENTS

| | | |
|---|---|---|
| EP | 4534415 | 4/2025 |
| JP | H08333015 | 12/1996 |

(Continued)

OTHER PUBLICATIONS

European Patent Office, European Search Report dated Aug. 23, 2024 in Application No. 24162280.2.

(Continued)

*Primary Examiner* — Ernesto A Suarez
*Assistant Examiner* — Laurence R Brothers
(74) *Attorney, Agent, or Firm* — SNELL & WILMER L.L.P.

(57) ABSTRACT

A cargo handling system includes a wireless cargo emergency stop system, a power relay communicatively coupled to the wireless cargo emergency stop system, and a power drive unit communicatively coupled to the power relay and the wireless cargo emergency stop system. Power to the power drive unit is removed in response to an emergency stop activated via the wireless cargo emergency stop system.

13 Claims, 16 Drawing Sheets

(56) References Cited

U.S. PATENT DOCUMENTS

| | | | | |
|---|---|---|---|---|
| 2020/0002091 | A1* | 1/2020 | Shields | B65G 1/0464 |
| 2020/0331610 | A1* | 10/2020 | Kish | B64C 19/00 |
| 2022/0379792 | A1* | 12/2022 | Wehner | B66F 9/063 |
| 2025/0117739 | A1* | 4/2025 | Setterstrom | B65G 1/1371 |

FOREIGN PATENT DOCUMENTS

| | | |
|---|---|---|
| JP | 2016111545 | 6/2016 |
| JP | 2020505296 | 2/2020 |

OTHER PUBLICATIONS

European Patent Office, European Office Action dated Oct. 8, 2025 in Application No. 24162280.2.

* cited by examiner

WIRELESS EMERGENCY STOP SYSTEM FOR CARGO APPLICATIONS

FIELD

The present disclosure generally relates to the field of cargo handling systems and, more particularly, to wireless emergency stop controls for such cargo handling systems.

BACKGROUND

As technology is expanding in the cargo aircraft industry, wireless devices are becoming more common. State of the art cargo systems utilize physical control panels that are electrically and mechanically coupled to a structure within the aircraft cargo area. Numerous benefits have been identified with the addition of wireless cargo interfaces, including system weight savings and reduction in the number of operators. However, a wireless control system has yet to be introduced to market within an air cargo solution for several reasons. Among these reasons exists the issue of ensuring cargo operator(s) safety during wireless operation.

In particular, the current state of the art cargo systems, have a hardwire emergency stop systems within a short distance of the control panels. Most control panels include a hardwired emergency stop button as part of the electronic assembly. A significant contribution to why these stop systems contribute to cargo safety is that they are independent in hardware/software design. In other words, they are not coupled to the control software, and hence isolated from any failures related to control system software functions.

SUMMARY

A cargo handling system is presented herein. The cargo handling system includes a wireless cargo emergency stop system, a power relay communicatively coupled to the wireless cargo emergency stop system, and a power drive unit communicatively coupled to the power relay and the wireless cargo emergency stop system. Power to the power drive unit is removed in response to an emergency stop activated via the wireless cargo emergency stop system.

In various embodiments, a hard-wired emergency stop system is communicatively coupled to the power relay and the power drive unit.

In various embodiments, the wireless cargo emergency stop system and the hard-wired emergency stop system are connected in series such that the hard-wired emergency stop system or the wireless cargo emergency stop system directly induces the emergency stop that removes the power from the power drive unit.

In various embodiments, the wireless cargo emergency stop system further includes a cargo emergency station and a wireless emergency module.

In various embodiments, the cargo emergency station further includes at least one electrical relay configured to remove power from the power drive unit.

In various embodiments, the cargo emergency station further includes at least one processor, interface for wireless communication, serial interface, indicators configured to display system statuses, or controls configured for interfacing between an operator and emergency functions.

In various embodiments, the cargo emergency station and the wireless emergency module are configured to communicate wirelessly.

In various embodiments, the wireless emergency module is a remote control comprising an E-stop button configured to receive a force from an operator to activate the emergency stop.

In various embodiments, the wireless emergency module further includes at least one processor, interface for wireless communication, serial interface, or indicators configured to display system statuses.

A method of operating a wireless emergency stop system is presented herein. The method includes associating a wireless emergency module with a wireless access point of a network of a cargo handling system, identifying cargo emergency station identification information broadcasted over the network, transmitting a request message to a cargo emergency station associated with the cargo emergency station identification information, transmitting a unique identifier, via the cargo emergency station, for the wireless emergency module, and pairing wireless emergency module with an associated cargo emergency station.

In various embodiments, the method further includes detecting an emergency stop function administered by an operator.

In various embodiments, the method further includes removing power to a power drive unit in response to the emergency stop function detected.

In various embodiments, the emergency stop function is administered by engaging an e-stop button on a wireless controller.

In various embodiments, the method further includes issuing an emergency fault if the paired wireless emergency module is no longer communicating with the cargo emergency station.

A cargo handling system is presented herein. The cargo handling system includes a wireless cargo emergency stop system and a wireless cargo control system integrated with the wireless cargo emergency stop system.

In various embodiments, the wireless cargo control system and the wireless cargo emergency stop system are configured in series with a hard-wired emergency stop system and a power relay system configured to distribute electrical drive power to a cargo power drive system, such that the wireless cargo control system, the wireless cargo emergency stop system, and the hard-wired emergency stop system are configured to communicate an emergency stop to remove the electrical drive power to the cargo power drive system.

In various embodiments, the wireless cargo control system includes a cargo control station configured to translate information from a paired wireless control module to an internal serial network of the cargo handling system.

In various embodiments, the wireless cargo emergency stop system includes a cargo emergency station and a wireless emergency module.

In various embodiments, the wireless emergency module is authenticated with the emergency stop communication via a unique identification number thereby forming a communication path between a wireless control module of the wireless cargo control system and the wireless emergency module.

In various embodiments, the wireless control module is configured to lose power to its circuit and thus lose communication with the wireless cargo control system in response to the emergency stop communication, thus terminating power to the cargo power drive system.

BRIEF DESCRIPTION OF THE DRAWINGS

The subject matter of the present disclosure is particularly pointed out and distinctly claimed in the concluding portion of the specification. An understanding of the present disclosure may be further facilitated by referring to the following detailed description and claims in connection with the following drawings. While the drawings illustrate various embodiments employing the principles described herein, the drawings do not limit the scope of the claims. Reference to "in accordance with various embodiments in this Brief Description of the Drawings also applies to the corresponding discussion in the Detailed Description.

DETAILED DESCRIPTION

Figure 1A:
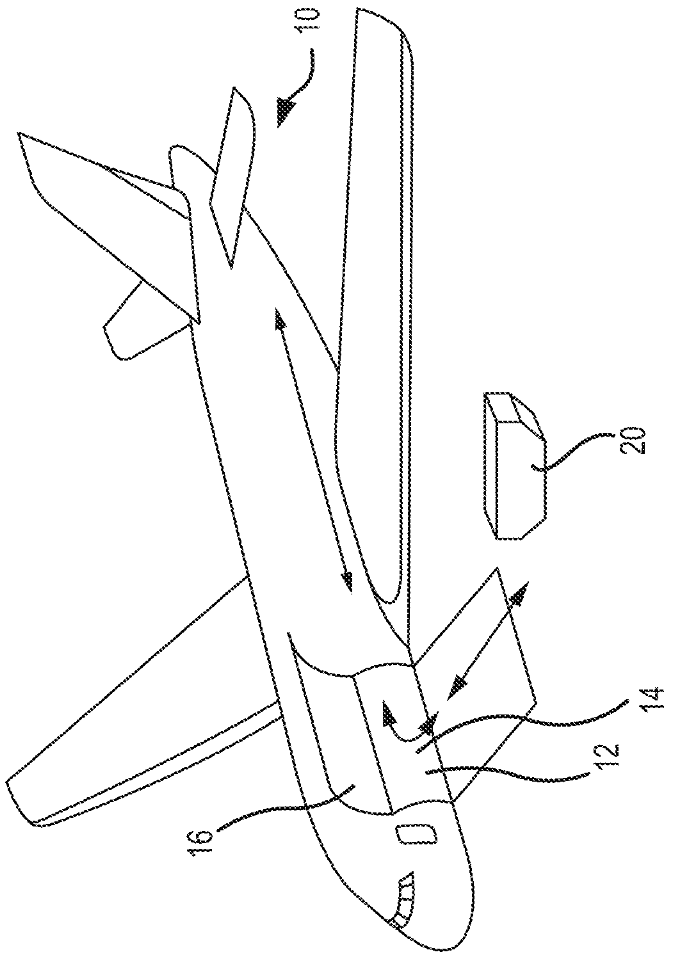
FIG. 1A illustrates a schematic of an aircraft being loaded with cargo, in accordance with various embodiments.

With reference to FIG. 1A, a schematic view of an aircraft 10 having a cargo deck 12 located within a cargo compartment 14 is illustrated, in accordance with various embodiments. The aircraft 10 may comprise a cargo load door 16 located, for example, at one side of a fuselage structure of the aircraft 10. A unit load device (ULD) 20, in the form of a container or pallet, for example, may be loaded through the cargo load door 16 and onto the cargo deck 12 of the aircraft 10 or, conversely, unloaded from the cargo deck 12 of the aircraft 10. In general, ULDs are available in various sizes and capacities, and are typically standardized in dimension and shape. Once loaded with items destined for shipment, the ULD 20 is transferred to the aircraft 10 and then loaded onto the aircraft 10 through the cargo load door 16 using a conveyor ramp, scissor lift or the like. Once inside the aircraft 10, the ULD 20 is moved within the cargo compartment 14 to a final stowed position. Multiple ULDs may be brought on-board the aircraft 10, with each ULD 20 being placed in a respective stowed position on the cargo deck 12. After the aircraft 10 has reached its destination, each ULD 20 is unloaded from the aircraft 10 in similar fashion, but in reverse sequence to the loading procedure. To facilitate movement of the ULD 20 along the cargo deck 12, the aircraft 10 may include a cargo handling system as described herein in accordance with various embodiments.

Figure 1B:
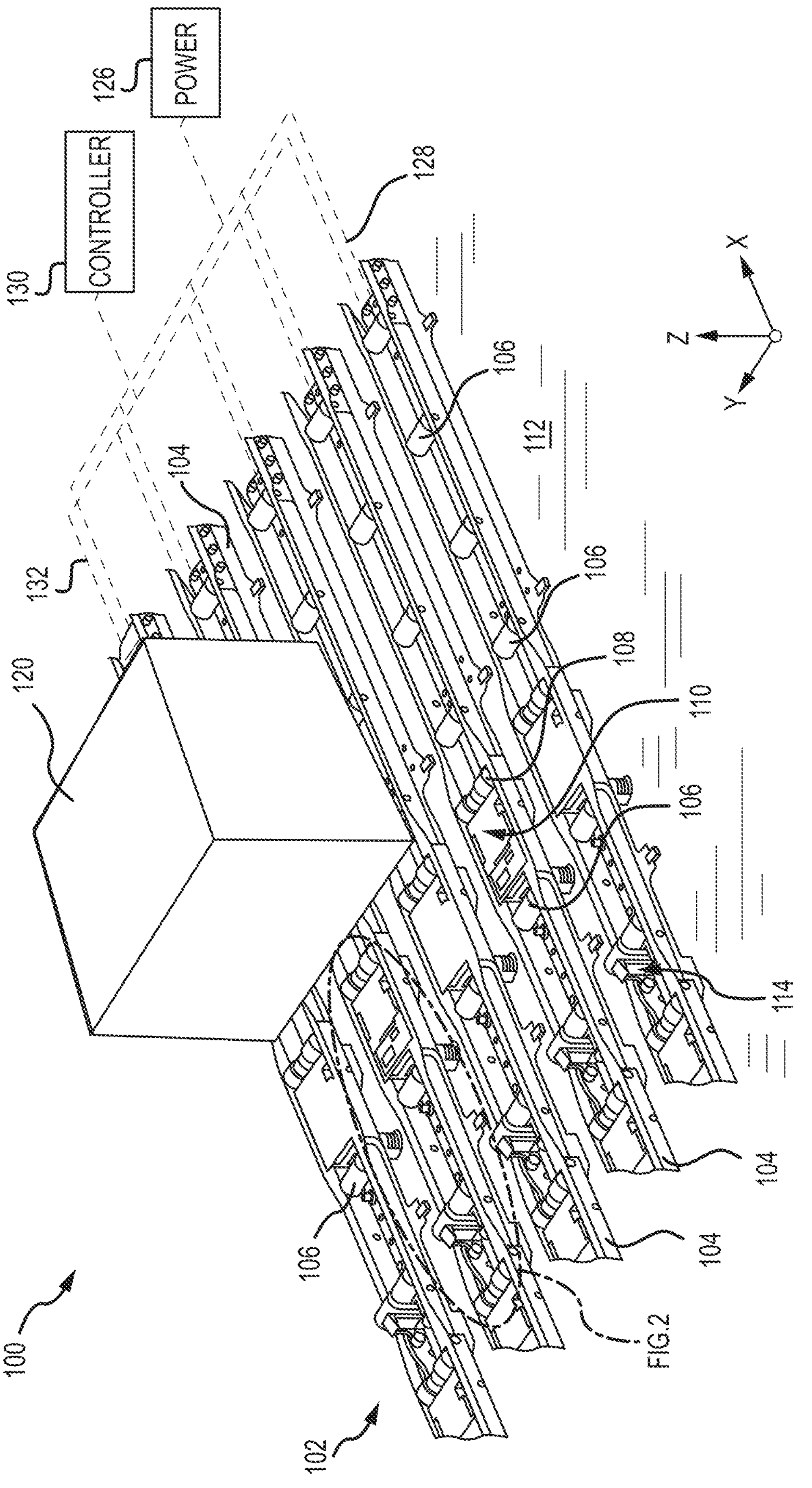
FIG. 1B illustrates a portion of a cargo handling system, in accordance with various embodiments.

Referring now to FIG. 1B, a portion of a cargo handling system 100 is illustrated, in accordance with various embodiments. The cargo handling system 100 is illustrated with reference to an XYZ coordinate system, with the X-direction extending longitudinally and the Z-direction extending vertically with respect to an aircraft in which the cargo handling system 100 is positioned, such as, for example, the aircraft 10 described above with reference to FIG. 1A. In various embodiments, the cargo handling system 100 may define a conveyance surface 102 having a plurality of trays 104 supported by a cargo deck 112, such as, for example, the cargo deck 12 described above with reference to FIG. 1A. The plurality of trays 104 may be configured to support a unit load device (ULD) 120 (or a plurality of ULDs), such as, for example, the unit load device (ULD) 20 described above with reference to FIG. 1A. In various embodiments, the ULD 120 may comprise a container or a pallet configured to hold cargo as described above. In various embodiments, the plurality of trays 104 is disposed throughout the cargo deck 112 and may support a plurality of conveyance rollers 106, where one or more or all of the plurality of conveyance rollers 106 is a passive roller.

In various embodiments, the plurality of trays 104 may further support a plurality of power drive units (PDUs) 110, each of which may include one or more drive wheels or rollers 108 that may be actively powered by a motor. In various embodiments, one or more of the plurality of trays 104 is positioned longitudinally along the cargo deck 112—e.g., along the X-direction extending from the forward end to the aft end of the aircraft. In various embodiments, the plurality of conveyance rollers 106 and the one or more drive rollers 108 may be configured to facilitate transport of the ULD 120 in the forward and the aft directions along the conveyance surface 102. During loading and unloading, the ULD 120 may variously contact the one or more drive rollers 108 to provide a motive force for transporting the ULD 120 along the conveyance surface 102. Each of the plurality of PDUs 110 may include an actuator, such as, for example, an electrically operated motor, configured to drive the one or more drive rollers 108 corresponding with each such PDU 110. In various embodiments, the one or more drive rollers 108 may be raised from a lowered position beneath the conveyance surface 102 to an elevated position protruding above the conveyance surface 102 by the corresponding PDU. As used with respect to cargo handling system 100, the term "beneath" may refer to the negative Z-direction, and the term "above" may refer to the positive Z-direction with respect to the conveyance surface 102. In the elevated position, the one or more drive rollers 108 variously contact and drive the ULD 120 that otherwise rides on the plurality of conveyance rollers 106. Other types of PDUs, which can also be used in various embodiments of the present disclosure, may include a drive roller that is held or biased in a position above the conveyance surface by a spring. PDUs as disclosed herein may be any type of electrically powered rollers that may be selectively energized to propel or drive the ULD 120 in a desired direction over the cargo deck 112 of the aircraft. The plurality of trays 104 may further support a plurality of restraint devices 114. In various embodiments, each of the plurality of restraint devices 114 may be configured to rotate downward as the ULD 120 passes over and along the conveyance surface 102. Once the ULD 120 passes over any such one of the plurality of restraint devices 114, such restraint device 114 returns to its upright position, either by a motor driven actuator or a bias member, thereby restraining or preventing the ULD 120 from translating in the opposite direction.

In various embodiments, the cargo handling system 100 may include a system controller 130 in communication with each of the plurality of PDUs 110 via a plurality of channels 132. Each of the plurality of channels 132 may be a data bus, such as, for example, a controller area network (CAN) bus. An operator may selectively control operation of the plurality of PDUs 110 using the system controller 130. In various embodiments, the system controller 130 may be configured to selectively activate or deactivate the plurality of PDUs 110. Thus, the cargo handling system 100 may receive operator input through the system controller 130 to control the plurality of PDUs 110 in order to manipulate movement of the ULD 120 over the conveyance surface 102 and into a desired position on the cargo deck 112. In various embodiments, the system controller 130 may include a general purpose processor, a digital signal processor (DSP), an application specific integrated circuit (ASIC), a field programmable gate array (FPGA) or some other programmable logic device, discrete gate or transistor logic, discrete hardware components, or any combination thereof. The cargo handling system 100 may also include a power source 126 configured to supply power to the plurality of PDUs 110 or to the plurality of restraint devices 114 via one or more power busses 128. The system controller 130 may be complimented by or substituted with an agent-based control system, whereby control of each PDU and associated componentry—e.g., the restraint devices—is performed by individual unit controllers associated with each of the PDUs and configured to communicate between each other.

Figure 2:
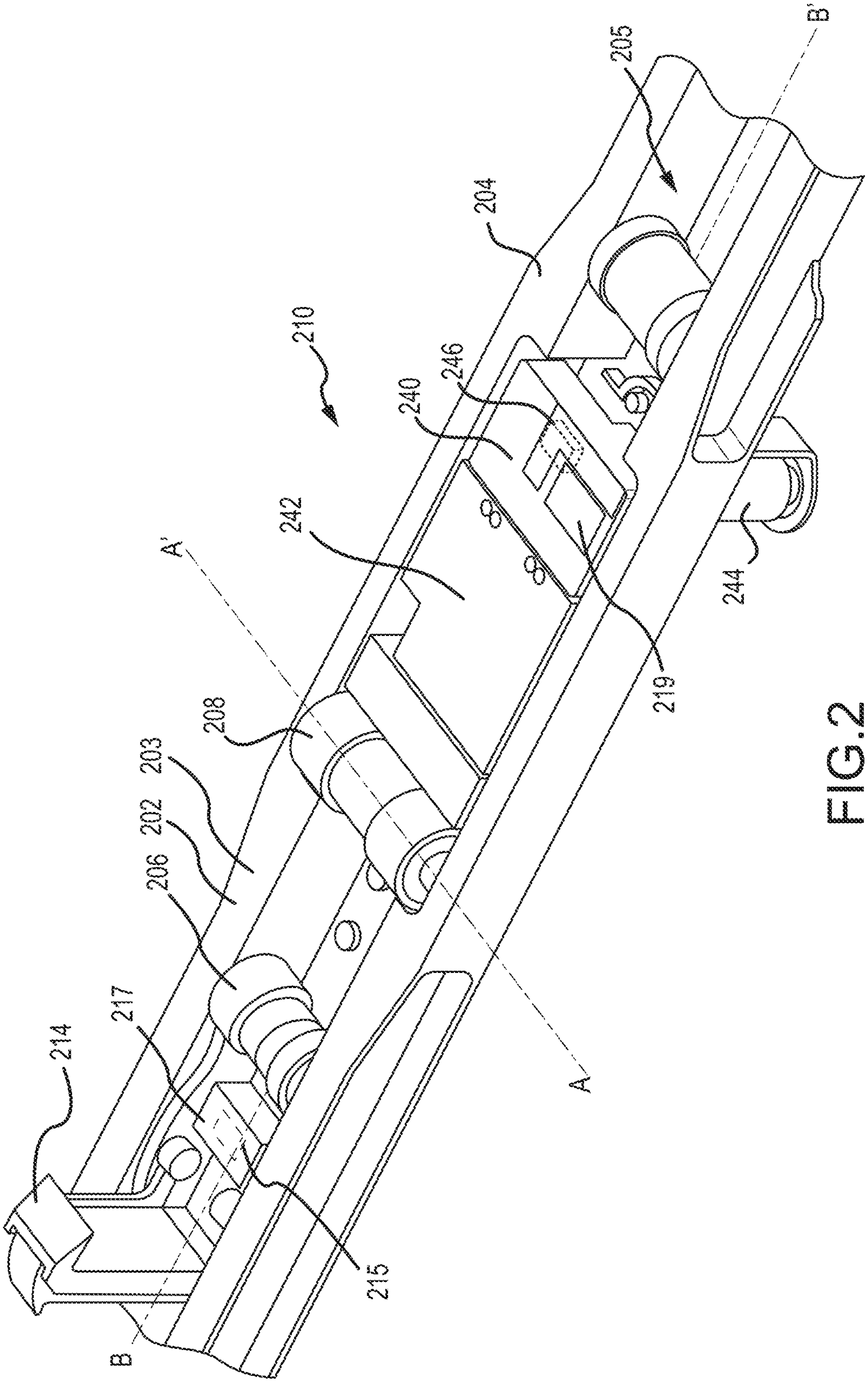
FIG. 2 illustrates a portion of a cargo handling system, in accordance with various embodiments.

Referring now to FIG. 2, a PDU 210, such as for example, one of the plurality of PDUs 110 described above with reference to FIG. 1B, is illustrated disposed in a tray 204, in accordance with various embodiments. The PDU 210 may rotate the drive roller 208 in one of two possible directions (e.g., clockwise or counterclockwise) to propel the ULD in a direction parallel to the longitudinal axis B-B' of the tray 204. The PDU 210 may comprise a unit controller 240, a unit motor 242 and a drive roller 208 mounted within an interior section 205 of the tray 204. The drive roller 208 may comprise a cylindrical wheel coupled to a drive shaft and configured to rotate about an axis A-A'. The drive roller 208 may be in mechanical communication with the unit motor 242, which may be, for example, an electromagnetic, electromechanical or electrohydraulic actuator or other servomechanism. The PDU 210 may further include gear assemblies and other related components for turning or raising the drive roller 208 so that the drive roller 208 may extend, at least partially, above a conveyance surface 202 which, in various embodiments, may be defined as the uppermost surface 203 of the tray 204. At least partial extension of the drive roller 208 above the conveyance surface 202 facilitates contact between the drive roller 208 and a lower surface of a ULD, such as, for example, the ULD 120 described above with reference to FIG. 1B. In various embodiments, the unit controller 240 is configured to control operation of the drive roller 208. The unit controller 240 may include a processor and a tangible, non-transitory memory. The processor may comprise one or more logic modules that implement logic to control rotation and elevation of the drive roller 208. In various embodiments, the PDU 210 may comprise other electrical devices to implement drive logic. In various embodiments, a connector 244 is used to couple the electronics of the PDU 210 to a power source and a system controller, such as, for example, the system controller 130 described above with reference to FIG. 1B. The connector 244 may have pins or slots and may be configured to couple to a wiring harness having pin programing. The unit controller 240 may be configured to receive commands from the system controller through the connector 244 in order to control operation of the unit motor 242.

In addition, a restraint device 214, such as, for example, one of the plurality of restraint devices 114 described above with reference to FIG. 1B, is illustrated as disposed within the tray 204 and configured to operate between a stowed position, whereby the ULD may pass over the restraint device, and a deployed position (as illustrated), whereby the ULD is restrained or prevented from translation in a longitudinal direction (e.g., along a longitudinal axis B-B') without the restraint device 214 first being returned to the stowed position. The restraint device 214 includes a restraint controller 215 and a restraint motor 217. In various embodiments, the restraint device 214 may be in mechanical communication with the restraint motor 217, which may be, for example, an electromagnetic, electromechanical or electrohydraulic actuator or other servomechanism. In various embodiments, the restraint controller 215 is configured to control operation of the restraint device 214. The restraint controller 215 may include a processor and a tangible, non-transitory memory. The processor may comprise one or more logic modules that implement logic to control operation of the restraint device 214 between the stowed and the deployed positions.

In various embodiments, the PDU 210 may also include a radio frequency identification device or RFID device 246, or similar device, configured to store, transmit or receive information or data—e.g., operational status or location data. Additionally, a ULD sensor 219 may be disposed within the tray 204 and configured to detect the presence of a ULD as the ULD is positioned over or proximate to the PDU 210 or the restraint device 214. In various embodiments, the ULD sensor 219 may include any type of sensor capable of detecting the presence of a ULD. For example, in various embodiments, the ULD sensor 219 may comprise a proximity sensor, a capacitive sensor, a capacitive displacement sensor, a Doppler effect sensor, an eddy-current sensor, a laser rangefinder sensor, a magnetic sensor, an active or passive optical sensor, an active or passive thermal sensor, a photocell sensor, a radar sensor, a sonar sensor, a lidar sensor, an ultrasonic sensor or the like.

Figure 3:
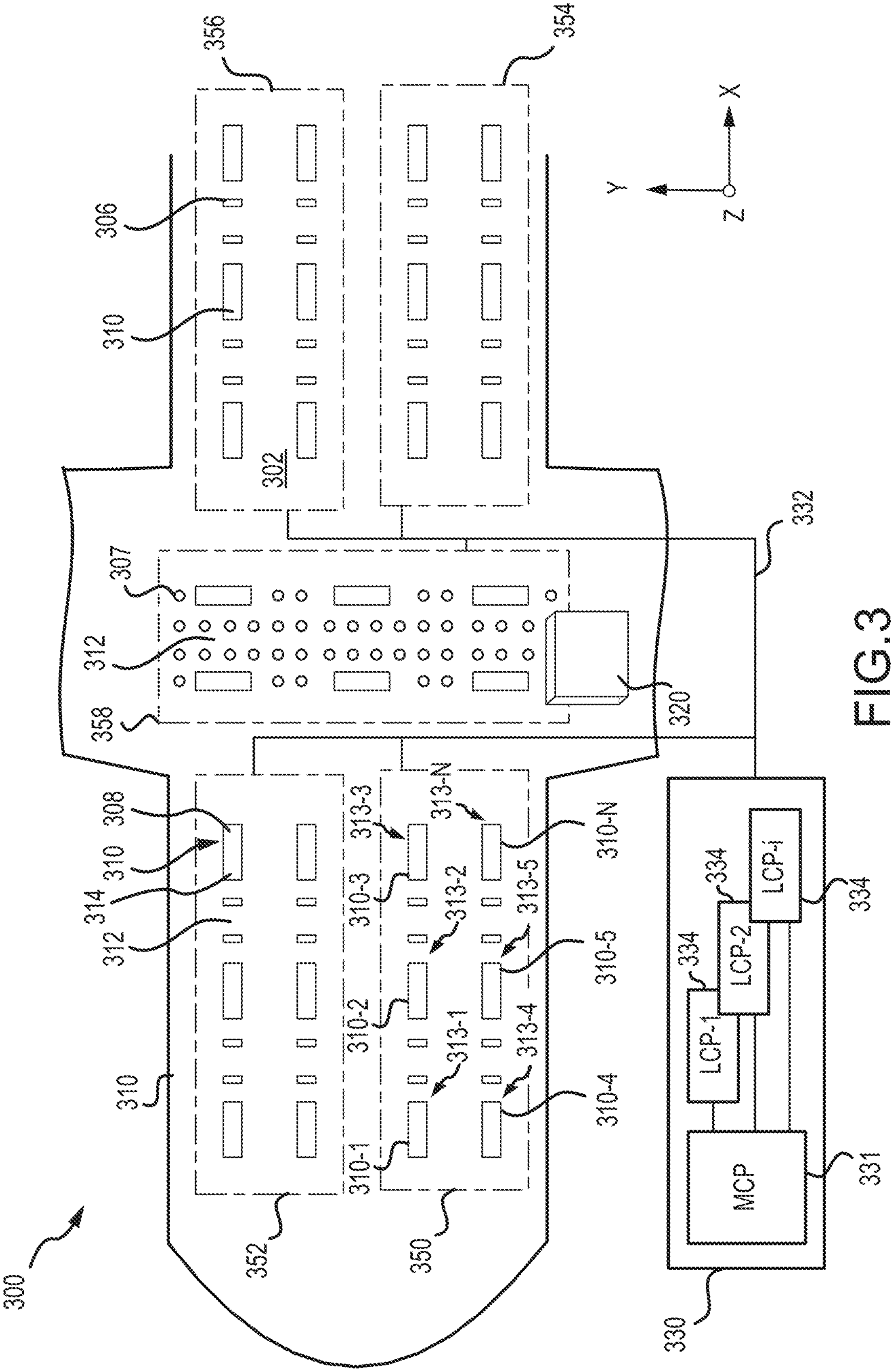
FIG. 3 illustrates a schematic view of a cargo deck having a cargo handling system with a plurality of PDUs, in accordance with various embodiments.

Referring now to FIG. 3, a schematic view of a cargo handling system 300 positioned on a cargo deck 312 of an aircraft is illustrated, in accordance with various embodiments. The cargo deck 312 may comprise a plurality of PDUs 310, generally arranged in a matrix configuration about the cargo deck 312. Associated with each of the plurality of PDUs 310 may be one or more drive rollers 308 and a restraint device 314. In various embodiments, the plurality of PDUs 310, the one or more drive rollers 308 and the restraint device 314 share similar characteristics and modes of operation as the PDU 210, drive roller 208 and restraint device 214 described above with reference to FIG. 2. Each of the one or more drive rollers 308 is generally configured to selectively protrude from a conveyance surface 302 of the cargo deck 312 in order to engage with a surface of a ULD 320 as it is guided onto and over the conveyance surface 302 during loading and unloading operations. A plurality of conveyance rollers 306 may be arranged among the plurality of PDUs 310 in a matrix configuration as well. The plurality of conveyance rollers 306 may comprise passive elements, and may include roller ball units 307 that serve as stabilizing and guiding apparatus for the ULD 320 as it is conveyed over the conveyance surface 302 by the plurality of PDUs 310.

In various embodiments, the cargo handling system 300 or, more particularly, the conveyance surface 302, is divided into a plurality of sections. As illustrated, for example, the conveyance surface 302 may include a port-side track and a starboard-side track along which a plurality of ULDs may be stowed in parallel columns during flight. Further, the conveyance surface 302 may be divided into an aft section and a forward section. Thus, the port-side and starboard-side tracks, in various embodiments and as illustrated, may be divided into four sections—e.g., a forward port-side section 350, a forward starboard-side section 352, an aft port-side section 354 and an aft starboard-side section 356. The conveyance surface 302 may also have a lateral section 358, which may be used to transport the ULD 320 onto and off of the conveyance surface 302 as well as transfer the ULD 320 between the port-side and starboard-side tracks and between the aft section and the forward section. The configurations described above and illustrated in FIG. 3 are exemplary only and may be varied depending on the context, including the numbers of the various components used to convey the ULD 320 over the conveyance surface 302. In various embodiments, for example, configurations having three or more track configurations, rather than the two-track configuration illustrated in FIG. 3, may be employed.

Each of the aforementioned sections—i.e., the forward port-side section 350, the forward starboard-side section 352, the aft port-side section 354 and the aft starboard-side section 356—may include one or more of the plurality of PDUs 310. Each one of the plurality of PDUs 310 has a physical location on the conveyance surface 302 that corresponds to a logical address within the cargo handling system 300. For purposes of illustration, the forward port-side section 350 is shown having a first PDU 310-1, a second PDU 310-2, a third PDU 310-3, a fourth PDU 310-4, a fifth PDU 310-5 and an N-th PDU 310-N. The aforementioned individual PDUs are located, respectively, at a first location 313-1, a second location 313-2, a third location 313-3, a fourth location 313-4, a fifth location 313-5 and an N-th location 303-N. In various embodiments, the location of each of the aforementioned individual PDUs on the conveyance surface 302 may have a unique location (or address) identifier, which, in various embodiments, may be stored in an RFID device, such as, for example, the RFID device 246 described above with reference to FIG. 2.

In various embodiments, an operator may control operation of the plurality of PDUs 310 using one or more control interfaces of a system controller 330, such as, for example, the system controller 130 described above with reference to FIG. 1B. For example, an operator may selectively control the operation of the plurality of PDUs 310 through an interface, such as, for example, a master control panel (MCP) 331. In various embodiments, the cargo handling system 300 may also include one or more local control panels (LCP) 334. In various embodiments, the master control panel 331 may communicate with the local control panels 334. The master control panel 331 or the local control panels 334 may also be configured to communicate with or send or receive control signals or command signals to or from each of the plurality of PDUs 310 or to a subset of the plurality of PDUs 310, such as, for example, the aforementioned individual PDUs described above with reference to the forward port-side section 350. For example, a first local control panel LCP-1 may be configured to communicate with the PDUs residing in the forward port-side section 350, a second local control panel LCP-2 may be configured to communicate with the PDUs residing in the forward starboard-side section 352, and one or more additional local control panels LCP-i may be in communication with the PDUs of one or more of the aft port-side section 354, the aft starboard-side section 356 and the lateral section 358. Thus, the master control panel 331 or local control panels 334 may be configured to allow an operator to selectively engage or activate one or more of the plurality of PDUs 310 to propel the ULD 320 along conveyance surface 302.

In various embodiments, each of the plurality of PDUs 310 may be configured to receive a command from the master control panel 331 or one or more of the local control panels 334. In various embodiments, the commands may be sent or information exchanged over a channel 332, which may provide a communication link between the system controller 330 and each of the plurality of PDUs 310. In various embodiments, a command signal sent from the system controller 330 may include one or more logical addresses, each of which may correspond to a physical address of one of the plurality of PDUs 310. Each of the plurality of PDUs 310 that receives the command signal may determine if the command signal is intended for that particular PDU by comparing its own address to the address included in the command signal.

Figure 4A:
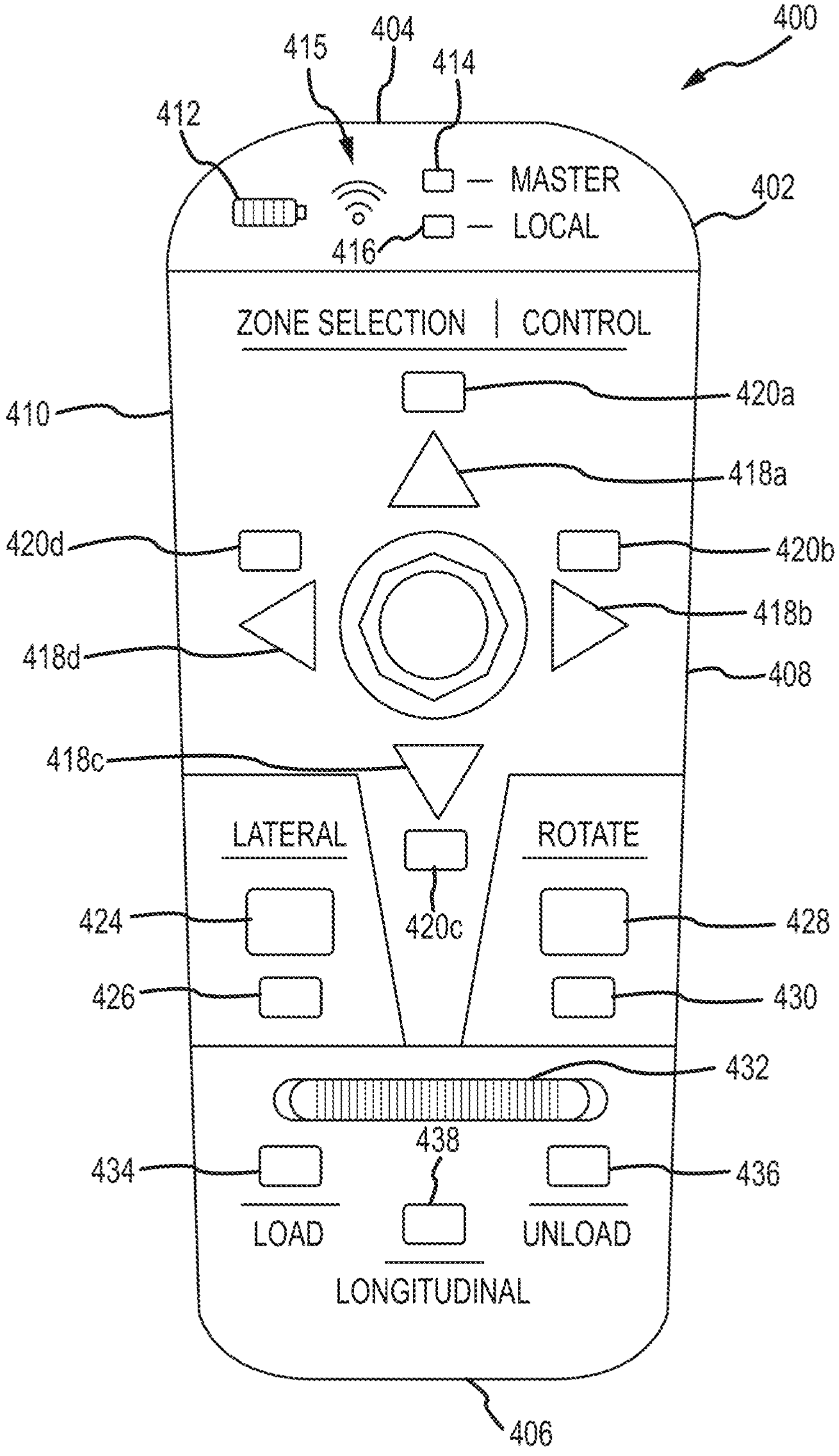
FIG. 4A is a top/plan view of a mobile cargo controller, in accordance with various embodiments.

FIG. 4A illustrates a mobile cargo controller for a cargo handling system, for instance in accordance with the foregoing, and that is identified by reference numeral 400. The mobile cargo controller 400 is a hand-held device, may be of any appropriate size, shape, and/or configuration, and includes a housing 402. This housing 402 (or more generally the mobile cargo controller 400) includes a forward end 404, an aft or rear end 406 that is oppositely disposed from the forward end 404 in a longitudinal dimension for the controller 400, a right side 408, and a left side 410 that is oppositely disposed from the right side 408 in a lateral dimension for the controller 400. The mobile cargo controller 400 also includes a battery indicator 412 (e.g., indicative of remaining battery power for the mobile cargo controller 400), a master controller indicator 414 (indicating, when activated, that the mobile cargo controller 400 is communicating with a master controller of a cargo handling system), a local controller indicator 416 (indicating, when activated, that the mobile cargo controller 400 is communicating with a local controller of a cargo handling system), and a wireless connection indicator 415 (indicating, when activated, that the mobile cargo controller 400 is in wireless communication with a master controller and/or a local controller). Each of the indicators 412, 414, 415, and 416 may be an activatable light source of any appropriate type, such as an LED.

The mobile cargo controller 400 includes selectors for selecting a plurality of different cargo zones (four being illustrated, although the mobile cargo controller 400 may be configured for any appropriate number of cargo zones). The noted cargo zone selectors include a cargo zone selector **418*a*, a cargo zone selector 418*b*, a cargo zone selector 418*c*, and a cargo zone selector 418*d*, with the cargo zone selectors 418*a* and 418*c* being oppositely disposed and spaced in the longitudinal dimension of the mobile cargo controller 400, and with the cargo zone selectors 418*b* and 418*d* being oppositely disposed and spaced in the lateral dimension of the mobile cargo controller 400. The cargo zone selector 418*a* may be characterized as being associated with the forward end 404 of the mobile cargo controller 400; the cargo zone selector 418***b* may be characterized as being associated with the right side 408 of the mobile cargo controller 400; the cargo zone selector 418*c* may be characterized as being associated with the aft or rear end 406 of the mobile cargo controller 400; and the cargo zone selector 418*d* may be characterized as being associated with the left side 410 of the mobile cargo controller 400. Each cargo zone selector 418*a*-418*d* may be characterized as an actuator, for instance a button. One or more of the cargo zone selectors 418*a*-418*d* may be used to select a particular cargo zone or combination of cargo zones in a cargo compartment and in a manner that will be discussed in more detail below. One actuation of a given cargo zone selector 418*a*-418*d* may be for activation of the same, and a subsequent actuation of a given cargo zone selector 418*a*-418*d* may be for an inactivation of the same.

The mobile cargo controller 400 includes a plurality of different cargo zone indicators. The noted cargo zone indicators include a cargo zone indicator 420*a*, a cargo zone indicator 420*b*, a cargo zone indicator 420*c*, and a cargo zone indicator 420*d*, with the cargo zone indicators 420*a* and 420*c* being oppositely disposed and spaced from one another in the longitudinal dimension of the controller 400, and with the cargo zone indicators 420*b* and 420*d* being oppositely disposed and spaced from one another in the lateral dimension for the controller 400. The cargo zone indicator 420*a* may be characterized as being associated with both the forward end 404 of the mobile cargo controller 400 and the cargo zone selector 418*a*; the cargo zone indicator 420*b* may be characterized as being associated with both the right side 408 of the mobile cargo controller 400 and the cargo zone selector 418*b*; the cargo zone indicator 420*c* may be characterized as being associated with both the aft or rear end 406 of the mobile cargo controller 400 and the cargo zone selector 418*c*; and the cargo zone indicator 420*d* may be characterized as being associated with both the left side 410 of the mobile cargo controller 400 and the cargo zone selector 418*d*. Each cargo zone indicator 420*a*-420*d* may be an activatable light source of any appropriate, such as an LED.

Figure 4B:
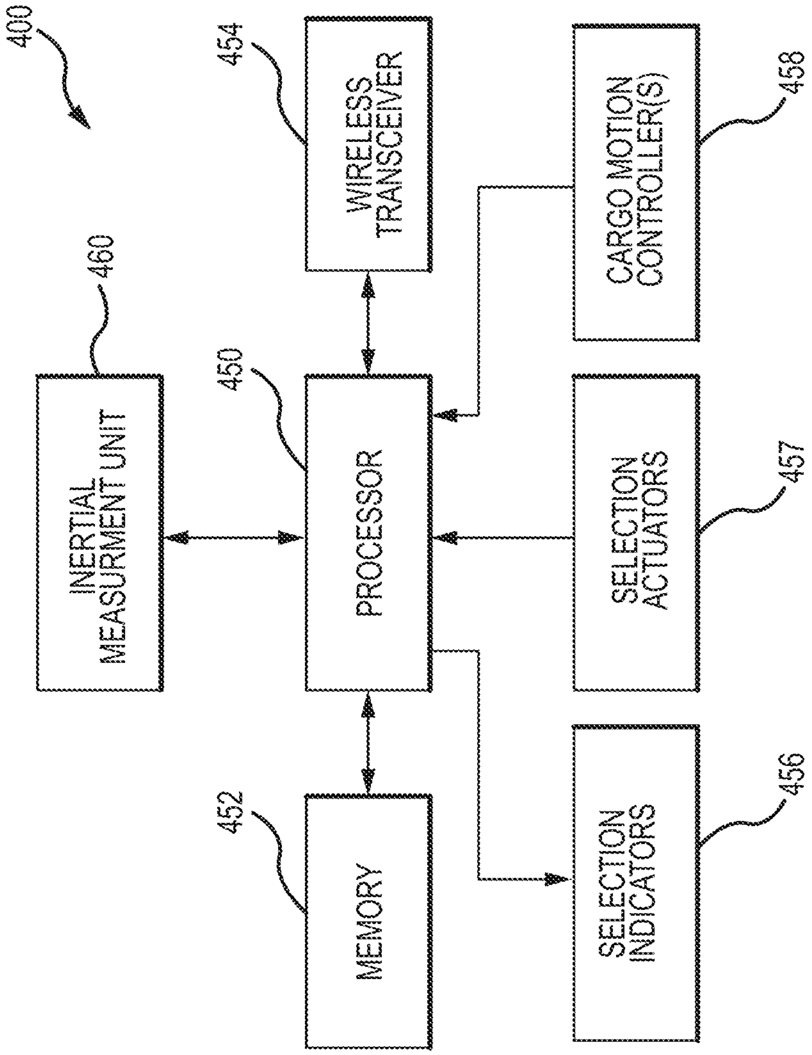
FIG. 4B is a functional schematic of the mobile cargo controller of FIG. 4A, in accordance with various embodiments.

A functional schematic of the mobile cargo controller 400 is presented in FIG. 4B. The mobile cargo controller 400 includes one or more processors 450 that may utilize any appropriate processing arrangement/architecture, memory 452, a wireless transceiver 454, a plurality of selection indicators 456 (e.g., cargo zone indicators 420*a*-420*d*; cargo lateral movement indicator 426; cargo rotation indicator 430; loading operation indicator 434; unloading operation indicator 436; longitudinal indicator 438), a plurality of selection actuators 457 (e.g., cargo zone selectors 418*a*-418*d*; cargo lateral movement selector 424; cargo rotation selector 428; operation selector 432), one or more cargo motion controllers 458 (e.g., cargo motion controller 422), and one or more inertial measurement units 460.

In various embodiments, memory 452 is configured to store information used in running the mobile cargo controller 400. In various embodiments, memory 452 comprises a computer-readable storage medium, which, in various embodiments, includes a non-transitory storage medium. In various embodiments, the term "non-transitory" indicates that the memory 452 is not embodied in a carrier wave or a propagated signal. In various embodiments, the non-transitory storage medium stores data that, over time, changes (e.g., such as in a random access memory (RAM) or a cache memory). In various embodiments, memory 452 comprises a temporary memory. In various embodiments, memory 452 comprises a volatile memory. In various embodiments, the volatile memory includes one or more of RAM, dynamic RAM (DRAM), static RAM (SRAM), and/or other forms of volatile memories. In various embodiments, memory 452 is configured to store computer program instructions for execution by processor 450. In various embodiments, applications and/or software running on mobile cargo controller 400 utilize(s) memory 452 in order to temporarily store information used during program execution. In various embodiments, memory 452 includes one or more computer-readable storage media. In various embodiments, memory 452 is configured to store larger amounts of information than volatile memory. In various embodiments, memory 452 is configured for longer-term storage of information. In various embodiments, memory 452 includes non-volatile storage elements, such as, for example, electrically programmable memories (EPROM), electrically erasable and programmable (EEPROM) memories, flash memories, floppy discs, magnetic hard discs, optical discs, and/or other forms of memories.

In various embodiments, processor 450 is configured to implement functionality and/or process instructions. In various embodiments, processor 450 is configured to process computer instructions stored in memory 452. In various embodiments, processor 450 includes one or more of a microprocessor, a controller, a digital signal processor (DSP), an application specific integrated circuit (ASIC), a field-programmable gate array (FPGA), or other equivalent discrete or integrated logic circuitry.

System program instructions and/or processor instructions may be loaded onto memory 452. The system program instructions and/or processor instructions may, in response to execution by operator, cause processor 450 to perform various operations. In particular, and as described in further detail below, the instructions may allow processor 450 to determine the orientation of the mobile cargo controller 400. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Referring now to FIGS. 5A-5D, the cargo handling system 300 includes a wireless emergency stop system 500. The wireless cargo emergency stop system 500 may be independent from a wireless control system software (e.g., the mobile cargo controller 400). Accordingly, the wireless cargo emergency stop system 500 provides a safer cargo loading experience when operating cargo wirelessly and/or autonomously. For instance, future cargo loading systems may include autonomous operations, in which it is possible that the cargo loading system will handle all cargo loading operations. Even in the cases of system autonomy, there may still be situations where humans need to inject themselves within the autonomous cargo loading environment. Under these conditions, it is important for operators to have a method of safety in the case that the autonomous system encounters a failure. The wireless cargo emergency stop system 500 architectures described herein provide an additional level of safety for these conditions.

The wireless cargo emergency stop system 500 may be integrated with the existing hard-wired emergency stop system 502 and the power relay 504. Accordingly, when wireless cargo emergency stop system 500 is activated, the wireless cargo emergency stop system 500 removes power to the power drive system 506 while a control panel 508 can still communicate with the rest of the system (e.g., cargo maintenance display unit, cargo master control panel, cargo wireless access point, cargo control station), thus preventing cargo from moving and to prevent harm to the operators. The wireless cargo emergency stop system 500 is electro-mechanically coupled to the aircraft and is connected in series with the existing hard-wired emergency stop system 502. Therefore, the hard-wired emergency stop system 502 or the wireless cargo emergency stop system 500 can directly induce an emergency stop function that ultimately removes functional-drive power from the cargo loading power drive system 506. Along with providing emergency stop functionality, the wireless cargo emergency stop system 500 may also be configured to report statuses relating to the emergency system through the cargo systems serial networks.

The wireless cargo emergency stop system 500 includes a cargo emergency station (CES) 510 and a wireless emergency module (WEM) 512. The CES 510 may include at least one electrical relay 514, or switching circuitry, configured to remove power from the cargo systems power drive system. The CES 510 may include at least one processor 515 for local system peripheral handling, logical calculations, and decision making. Further, the CES 510 may include at least one interface for wireless communication (Tx/Rx) 516 and at least one serial interface 518 for communicating with other systems within the cargo handling system 300 (e.g., cargo maintenance display unit, cargo master control panel, cargo wireless access point, cargo control station). The CES 510 is configured to directly communicate with one or more connected (e.g., paired) wireless cargo emergency devices. If no other designated wireless access point exists, the CES 510 could act as the wireless access point for the wireless cargo emergency stop system 500. The CES 510 may include indicators 519 configured to display system statuses such as Built In Test Equipment "BITE", emergency station status, wireless connection, error messaging, etc. The CES 510 may include additional controls 520 configured for interfacing between an operator and emergency functions. For instance, the CES 510 may include an operator interface providing status information, and controls relating to the emergency system.

Figure 5A:
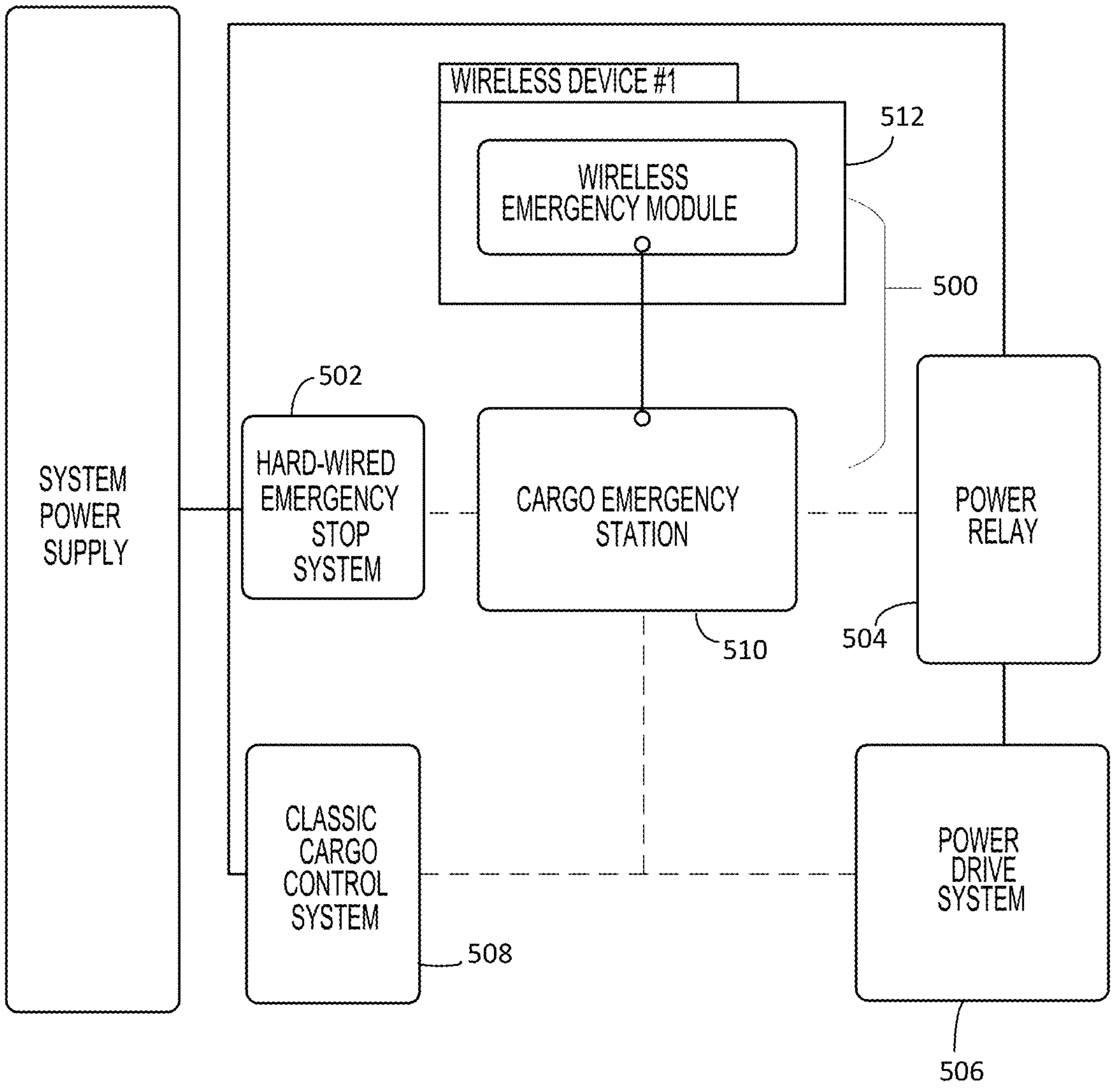
FIGS. 5A and 5B illustrate a wireless emergency stop system, in accordance with various embodiments.
Figure 5B:
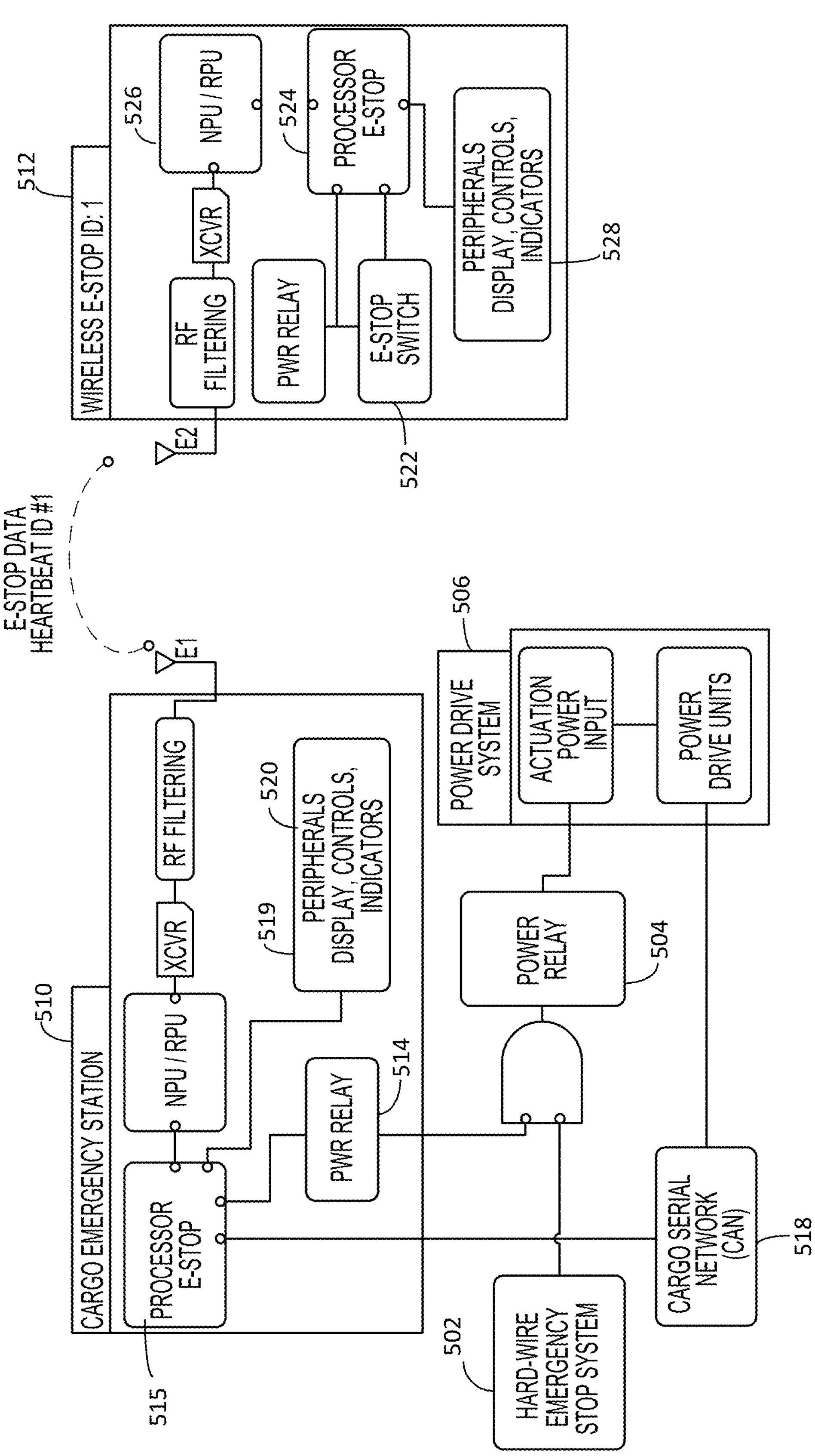
Figure 5C:
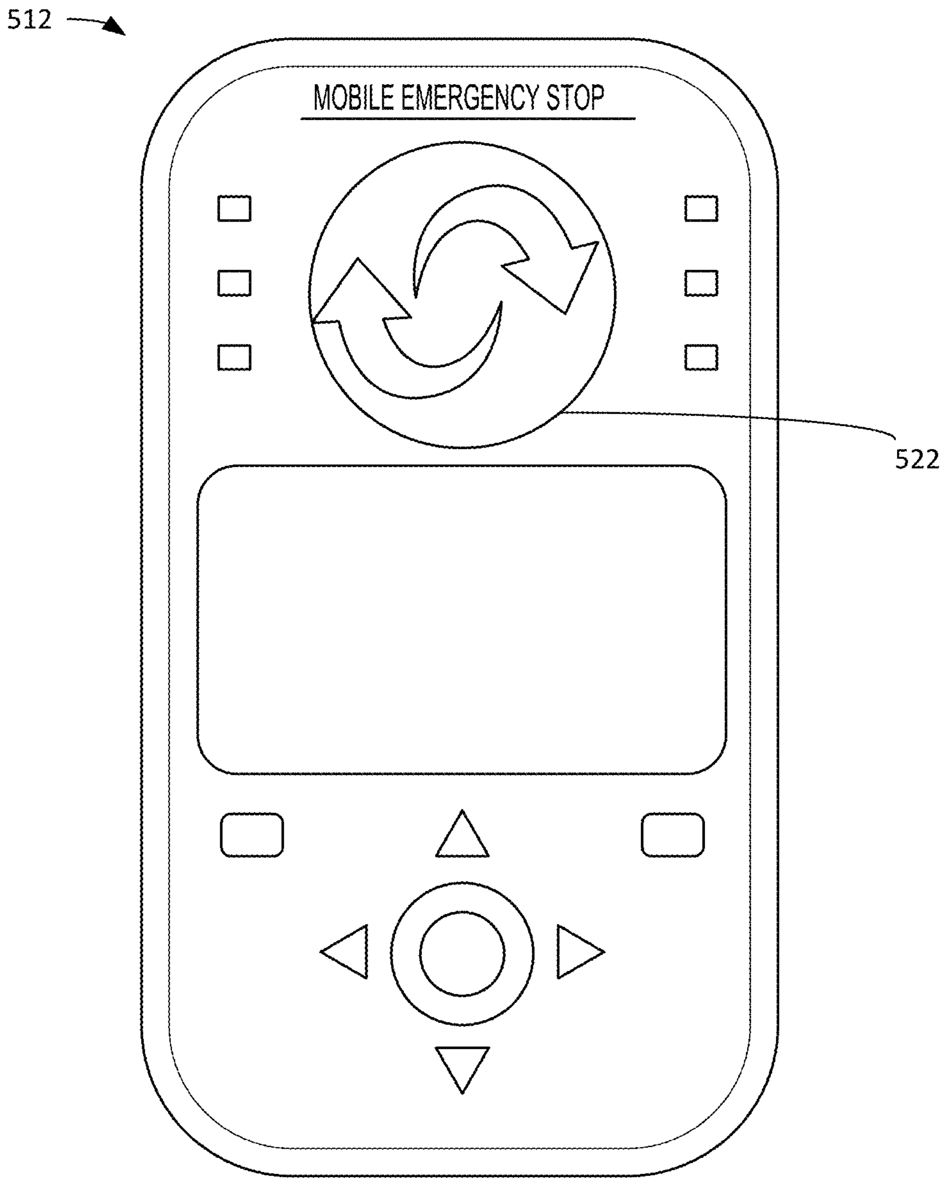
FIGS. 5C and 5D illustrate a wireless emergency module of the wireless emergency stop system of FIG. 5A, in accordance with various embodiments.
Figure 5D:
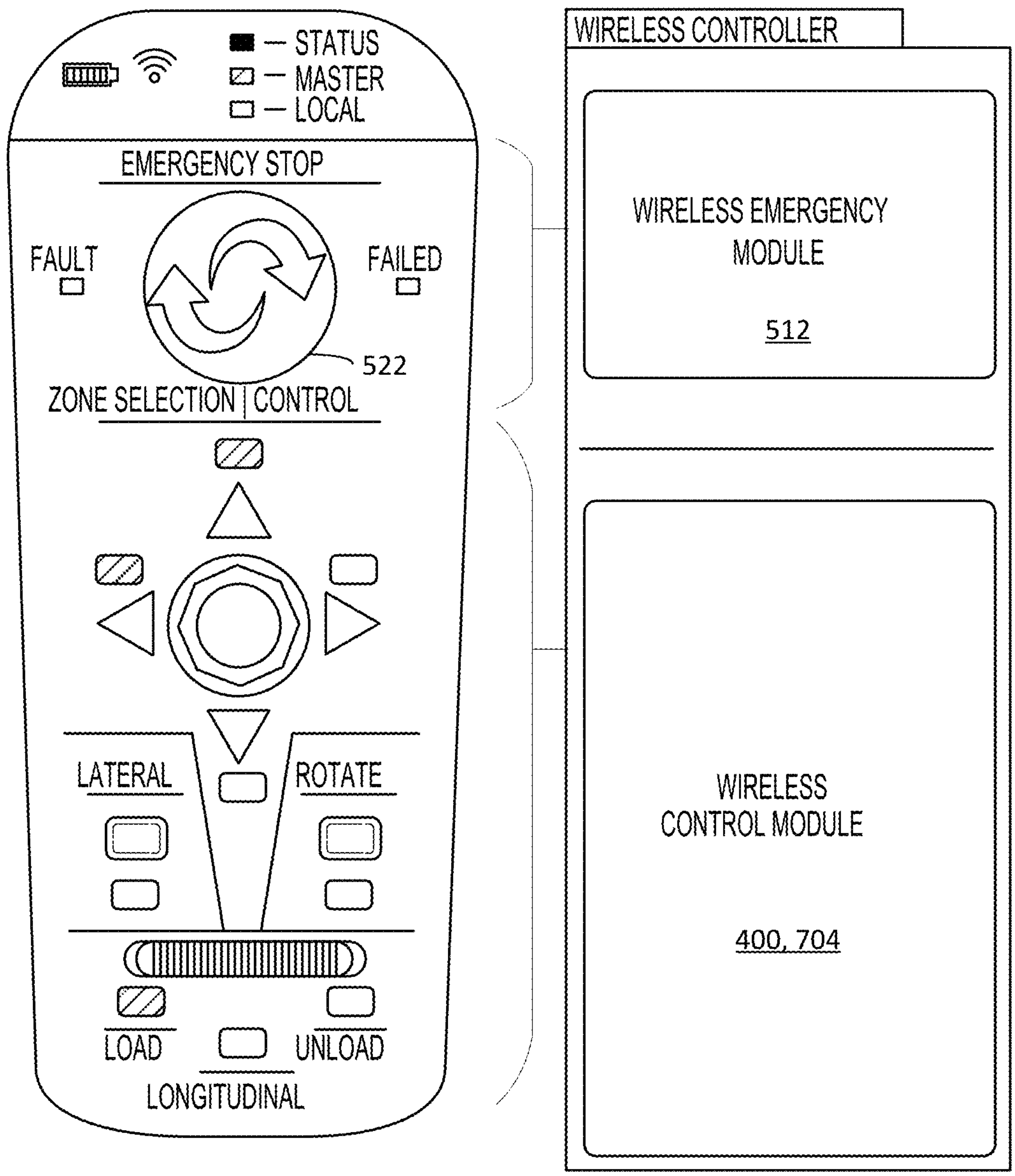

The WEM 512 communicates wirelessly with an associated CES 510. For instance, the WEM 512 may move with the operators and provide the capability to signal an emergency stop procedure wirelessly from anywhere in the cargo compartment. For instance, as shown in FIG. 5C, the WEM 512 may be a remote control. In various embodiments, the WEM 512 does not have to be its own physical device. For instance, the WEM 512 may be integrated with other wireless control functionality (e.g., FIG. 5D). The WEM 512 may include at least one E-stop button, or switch, 522. The E-stop button 522 may be configured to receive a force (e.g., press, push, etc.) from an operator for operator emergency stop engagement. The WEM 512 may include at least one interface for wireless communication (Tx/Rx) 524. The WEM 512 may include at least one processor 524 for local system peripheral handling, logical calculations, and decision making. Further, the WEM 512 may include at least one serial interface 526 for communicating with other processing units. The WEM 512 may include indicators 528 for displaying system statuses such as Built In Test Equipment "BITE", emergency station status, wireless connection, error messaging, etc.

The wireless cargo emergency stop system 500 may be configured to communicate on a range of frequencies depending on the cargo handling system 300 requirements. For instance, the CES 510 and the WEM 512 may be configured to communicate over the various standards, such as IEEE802.11 Wi-Fi variants, IEEE 802.15.4 ZigBee, IEEE 802.15.1 Bluetooth, etc. In various embodiments, the compatible bands may be closer to the visible spectrum such as the infrared spectrum Depending on the communication standard the wireless cargo emergency stop system 500 is using, the standard may include its own security protocol. For example, if their network is using IEEE 802.11 Wi-Fi standard, then the wireless cargo emergency stop system 500 can utilize the latest security standards associated with IEEE 802.11 communication such as Wi-Fi Protected Access 3 (WPA3). Security is assumed when utilizing a closed network.

Figure 6:
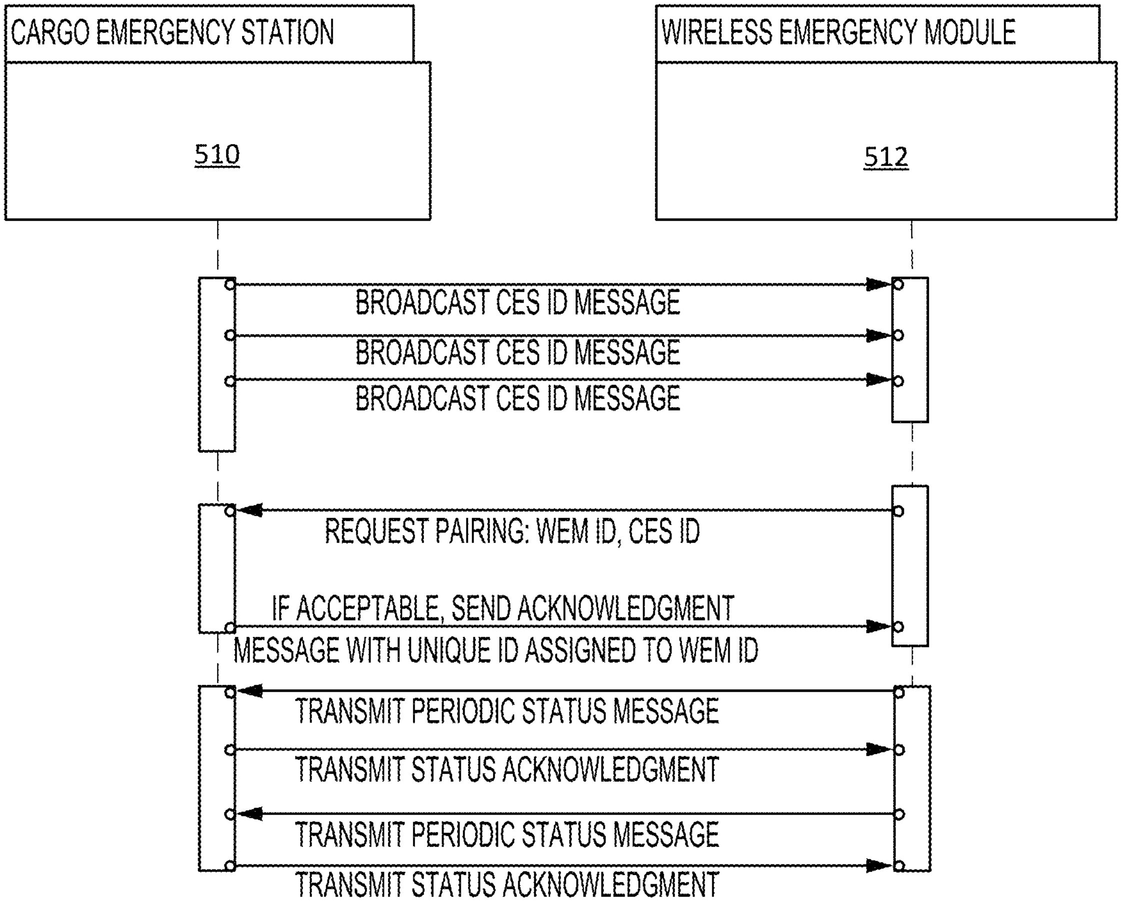
FIG. 6 illustrates a pairing between a wireless emergency module and a cargo emergency station of a wireless emergency stop system, in accordance with various embodiments.

As illustrated in FIG. 6, upon system startup, the WEM 512 is configured to pair with an associated CES 510. If the communication standard that the system is using first requires network access and authentication, the WEM 512 is configured to first associate itself with the networks wireless access point before further pairing with the CES 510 (802.11 network authentication for example). Upon granted network access, the WEM 512 is configured to identify valid CES identification information being broadcasted periodically over the network. The WEM 512 is configured to transmit a request message to a specified CES 510 following its identification information. Upon CES acceptance, the CES 510 will respond with an acknowledgement message including a unique ID for the WEM 512. This signifies that the pairing process is complete and regular status transmission is required between the WEM 512 and the CES 510 going forward.

In response to an emergency stop function being administered by the operator (e.g., engaging the e-stop button 522 or switch within the WEM 512), the processor 524 can detect when this event occurs. The WEM 512 may then wirelessly transmit an appropriate emergency stop message to the CES 510. Furthermore, the CES 510 is configured to interpret this message and engage an emergency stop. In various embodiments, the e-stop button 522 may be configured in series, thus interrupting the local power supply and the processor. Therefore, when the e-stop button 522 is engaged, it powers down the device and ultimately loses communication with the CES 510.

A paired WEM 512 is configured to maintain consistent communication with the CES 510. Once a WEM 512 has been paired with the CES 510, regular communication at a system defined frequency may be maintained. Each transmission from the WEM 512 could include data including Module ID (e.g., ID respective to the WEM), System ID (e.g., ID respective to the unique Cargo Emergency Station), Frame Counter (e.g., prevents frozen data and inhibits data frame hacking, and/or Payload (e.g., data relating to e-stop functional status). The CES 510 may be configured to issue an emergency fault if a paired WEM ID transmits payload information requesting an emergency stop function, a paired WEM ID missed transmission frequency threshold, a paired WEM ID is no longer communicating, a paired WEM ID transmits incorrect or unexpected Module ID, a paired WEM ID transmits incorrect or unexpected payload information, and/or a paired WEM ID transmits incorrect or unexpected frame counter.

Figure 7A:
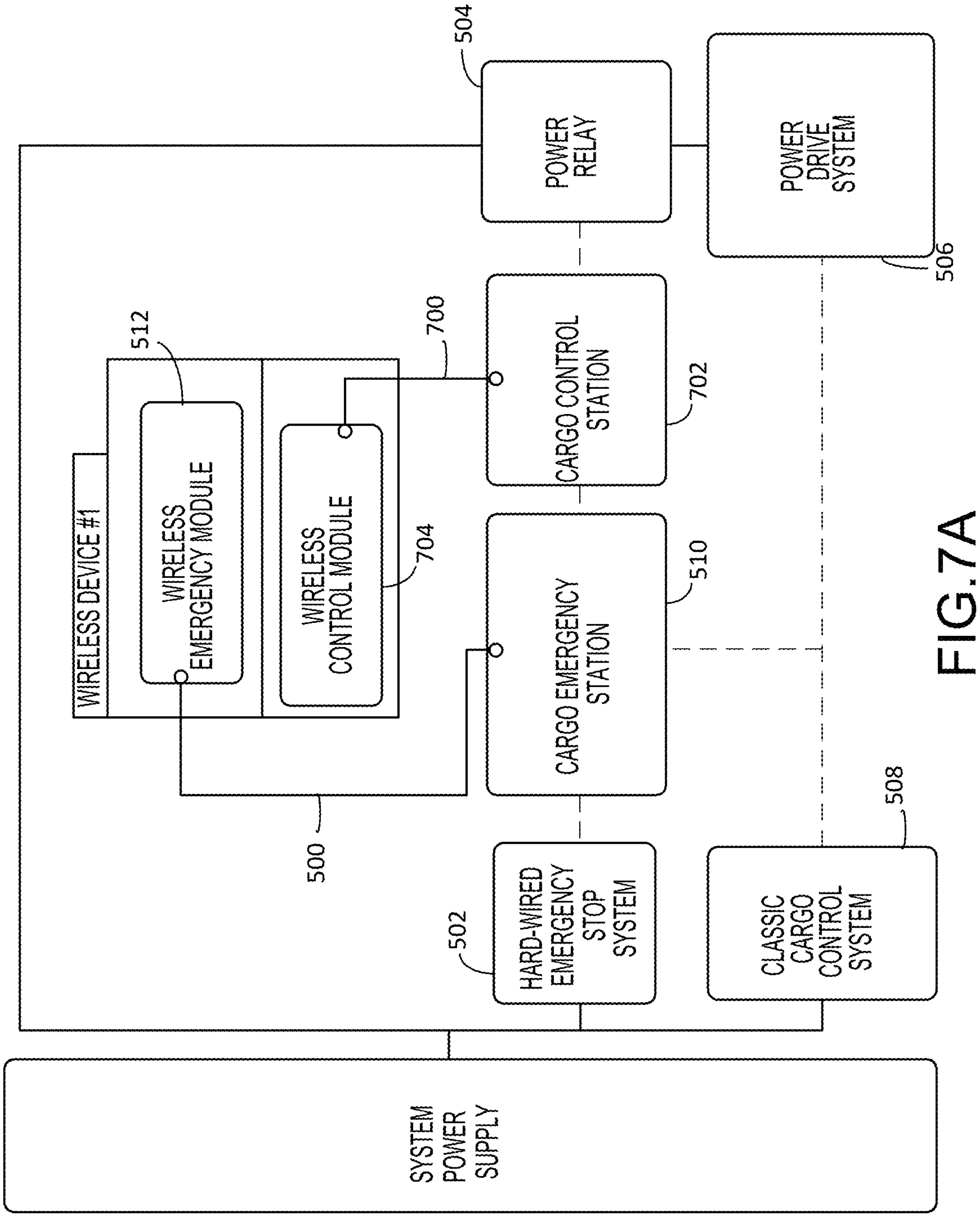
FIGS. 7A and 7B illustrate a wireless cargo emergency stop system integrated with a wireless cargo control system, in accordance with various embodiments.
Figure 7B:
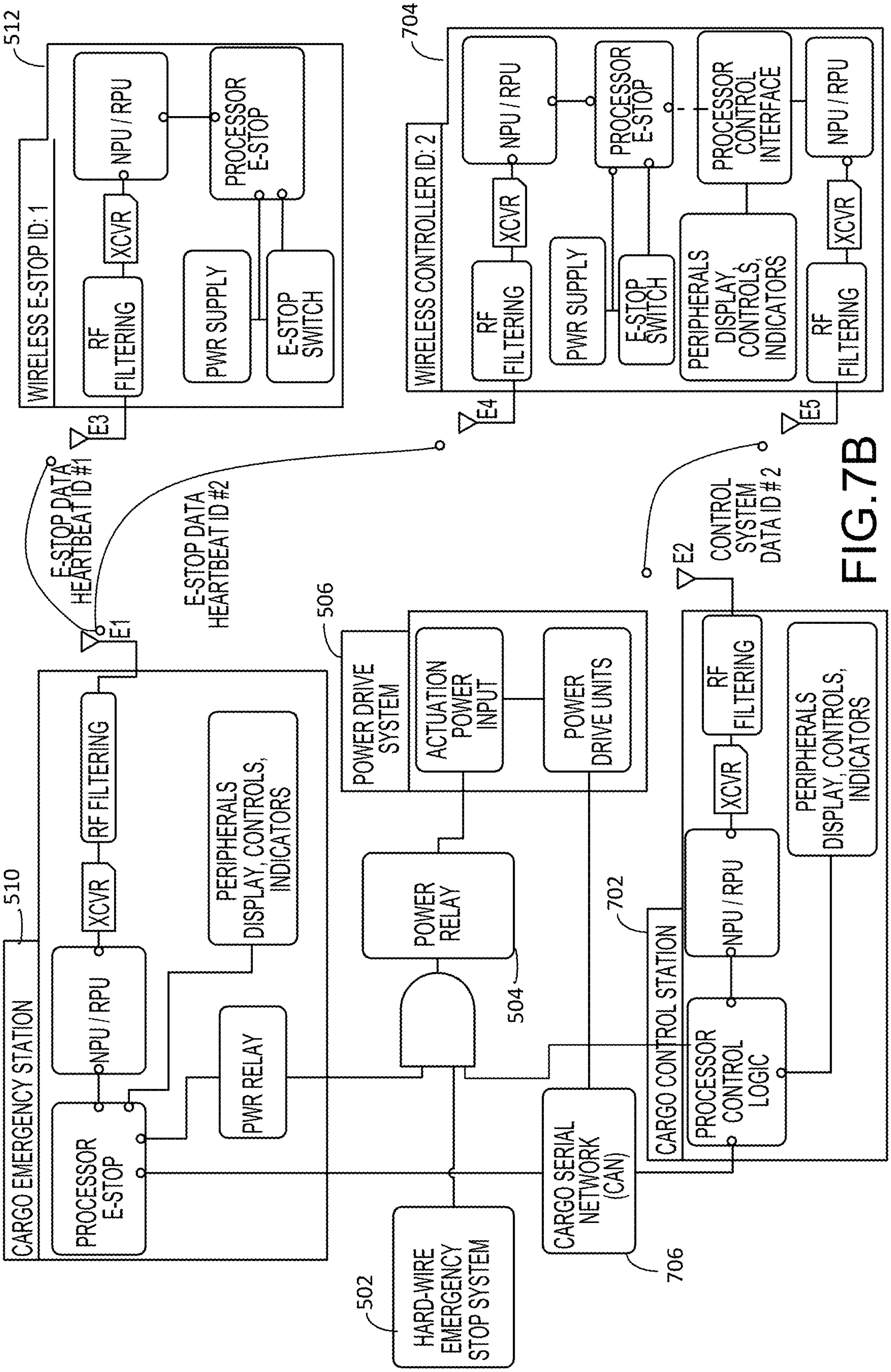

Referring now to FIGS. 7A-7B, the wireless cargo emergency stop system 500 is configured to provide a mobile safety feature during wireless control applications. Accordingly, the wireless cargo emergency stop system 500 is integrated with a wireless cargo control system 700 (e.g., the system controller 330 and the master control panel 331). For instance, the wireless cargo control system 700 and the wireless cargo emergency stop system 500 may be configured to be connected in series with the existing hard-wired emergency stop system 502 including the power relay system 504 that distributes electrical drive power to the cargo power drive system 506. Even though these two systems work together, their separation in hardware/software allocation is important to the overall system design. It is important that the "modules" (e.g., wireless emergency module and cargo control module) and "stations" (e.g., cargo emergency station and cargo control station) exist within the cargo system using their own individual processing units with their own respective circuits.

In such an integrated embodiment, the CES 510 may be electro-mechanically coupled to the aircraft and is connected in series with the existing hard-wired emergency stop system. Therefore, either the hard-wired emergency stop system, the cargo control station, described herein, or the CES can directly induce an emergency stop function. The CES may be configured to issue emergency faults for several conditions including operator administered emergency stop, loss of communication with, or unexpected data from, a paired WEM, and loss of communication with, or unexpected data from, the cargo control station.

Further, with respect to the WEM 512, if a wireless control device exists within the cargo system, the wireless control device may include a wireless emergency module along with the wireless control module. The WEM 512 may be configured to handle wireless emergency safety, while the wireless control module is configured to handle the control inputs and control logic. These two modules have separate processing units that are unique to their own functions.

The wireless cargo control system 700 includes a cargo control station (CCS) 702. The CCS 702 is electro-mechanically coupled to the aircraft, and is configured to translate information from a paired wireless control module (WCM) 704 to the cargo systems internal serial networks. If no other designated wireless access point exists, the CCS 702 could act as the wireless access point for the wireless control system. Similarly to the CES 512, the CCS 702 is connected in series with the existing hard-wired emergency stop system 502, and the CES 512. Therefore, either the hard-wired emergency stop system 502, the CES 512, or the CCS 702 can directly induce an emergency stop function. The CCS 702 can issue emergency faults for several conditions including loss of communication with, or unexpected data from, a paired WCM 704, and loss of communication with, or unexpected data from, the CES.

Referring particularly to FIG. 7B, the wireless emergency stop system 500 and the wireless control system 700 each have their own unique wireless networks. The CES 510 consistently communicates with all paired WEMs 512, while the CCS 702 consistently communicates with all paired WCMs 704. These two stations also communicate together over a cargo serial network 706. It is intended that a wireless control includes both the WEM 512 and a WCM 704 (e.g., see FIG. 5D). These two modules will have their own separate unique hardware and software. These two systems collaborate; and both systems can terminate actuation power provided to the cargo power drive system 506.

Figure 7C:
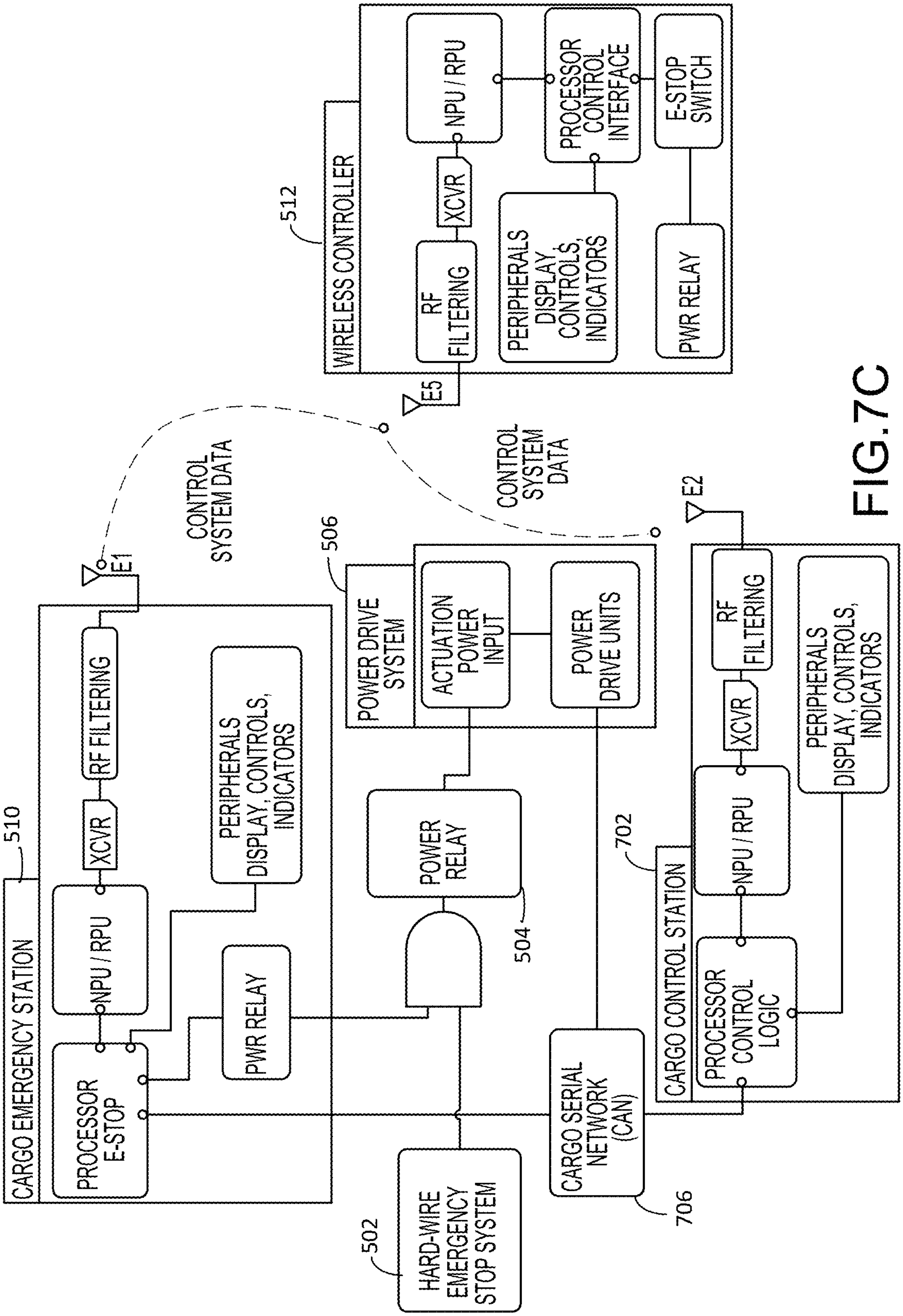
FIG. 7C illustrates a wireless cargo emergency stop system integrated with a wireless cargo control system, in accordance with various embodiments.

Referring now to FIG. 7C, the wireless emergency stop system 500 and the wireless control system 700 may operate on the same network. For instance, the wireless emergency stop system 500 may receive a transmission from the wireless control system 700, and monitors for wireless control devices. If an emergency signal is present, or if a wireless control device misses a transmission window frequency, the CES 510 can remove power form the power drive system 506. Because the wireless emergency stop system 500 and the wireless control system 700 work independently on the same network, there is no need to include a discrete wireless emergency module in the wireless control device 512.

Figure 8:
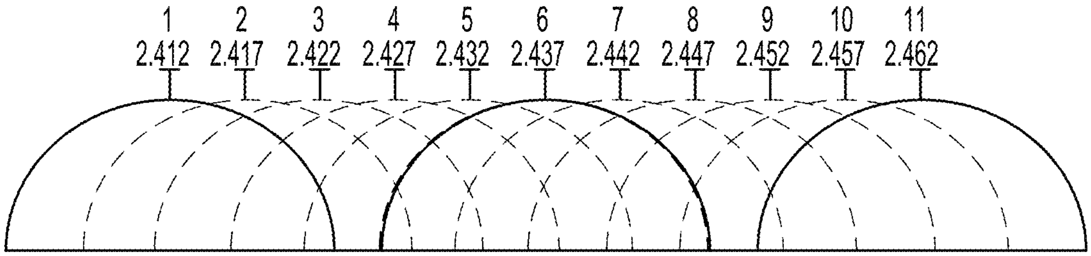
FIG. 8 illustrates a network between the wireless cargo emergency stop system and the wireless cargo control system of FIG. 7A, in accordance with various embodiments.

Referring briefly to FIG. 8, to avoid packet collision, these two networks may be on separate frequencies or channels. For example, if both the wireless emergency stop system 500 and the wireless control system 700 are communicating at 2.4 GHz, it is possible that the two systems communicate on their own distinct channels within the 2.4 GHz range (example: channel 1 and channel 11 respectively). In various embodiments, these two networks may be on completely separate frequency bands and separate wireless transmission standards. Some of these standards could include: IEEE802.11 Wi-Fi variants, IEEE 802.15.1 Bluetooth, etc. In various embodiments, the wireless emergency stop system 500 and the wireless control system 700 may be configured to communicate on the same network. However, a serial network may help with certification and safety. Further, the networking does not have to be restricted to a 2.4 Ghz band, can operate on more than one unlicensed band, or can license a band for the wireless e-stop portion and can be any frequency. Further, the two networks may each have their own security protocols that fall within their respective chosen communication standards. For example, if their network is using IEEE 802.11 Wi-Fi standard, then this system can utilize the latest security standards associated with IEEE 802.11 communication such as Wi-Fi Protected Access 3 (WPA3).

Identification and association between the wireless emergency stop system 500 and the wireless control system 700 is critical to this architecture. For instance, in the pairing process described herein, when the WEM 512 is authenticated with the CES 510, the CES 510 is assigned the WEM an ID number. This number is intended to be used as the unique ID for the wireless device. Therefore, if the WEM 512 has a path of communication with the WCM 704, then the WEM 512 can pass the ID number to the WCM 704. These two modules may share a unique ID that pairs them together and furthermore identifies the wireless controller.

If communication between the WEM 512 and the WCM 704 is not desired, other methods of assigning a unique ID number may include transferred in hardware within the system, a serial number of one of the devices, pin programming/addressing, passed through NFC, etc. If one of these methods are chosen, the WEM would be configured to communicate this unique ID in the pairing process of the CES 510. Therefore, the CES 510 is aware of the Unique ID associated with the WEM and WCM pair.

If no associated ID number is detected, an emergency stop may be initiated. In response to an emergency stop function being administered by the operator (e.g., engaging the e-stop button 522 or switch within the WEM 512), the processor 524 can detect when this event occurs. The WEM 512 may then wirelessly transmit an appropriate emergency stop message to the CES 510. Furthermore, the CES 510 is configured to interpret this message and engage an emergency stop. In various embodiments, the e-stop button 522 may be configured in series, thus interrupting the local power supply and the processor. Therefore, when the e-stop button 522 is engaged, it powers down the device and ultimately loses communication with the CES 510.

If the emergency stop function is administered by an operator using a wireless control device, the WCM 704 may lose power to its circuit and ultimately lose communication with the CCS 702. During this situation, the CCS 702 will also terminate power to the power drive system 506. Furthermore, either/both wireless emergency stop system 500 and/or the wireless control system 700 are configured to remove power from the power drive system 706 under the condition of an operator issued emergency stop.

Every active WCM 705 must have an associated WEM 512. The CES 510 may communicate with the CCS 702 (and other cargo devices) over a cargo system serial network. The CES 510 and the CCS 702 may each have their own unique status messages in which they transmit on the systems serial network at a regular frequency. These status messages can include many different packets of information, some of which can include the data relating to the wireless modules in which they are communicating with (emergency and control respectively). If a message is present, it checks to see if the active WCM IDs are associated with appropriate active WEM IDs. If all active WCM IDs are found to have all associated WEM IDs, then the CES 510 maintains an active "NORMAL" status within its status message pertaining to the Emergency Stop function. If a WCM 704 message is present and the CES 510 finds that there is NO WEM ID associated with the active WCM ID, then the CES 510 forces a "WARN" status within its status message pertaining to the Emergency Stop function. If, however, the CES 510 finds that cargo is being commanded to move by the WCM ID without an associated WEM ID, the CES 510 forces a "FAILED" status within its status message pertaining to the Emergency Stop function. In the "FAILED" condition, the CES 510 will engage its emergency procedure by removing actuation power from the power drive system 506.

The CCS 702 monitors the serial network for messages relating to the CES 510. If the CES 510 has a "NORMAL" status, then the CCS 702 can proceed to provide power drive system control commands associated to the WCM IDs communicated on the serial network. If the CES 510 has a "WARN" or "FAILED" status, then the CCS 702 will not provide power drive system control commands associated to the WCM IDs presented on the serial network.

Every paired WCM 704 may maintain consistent communication with the CCS 702. Once the WCM 704 has been paired with the CCS 702, it may maintain regular communication at a system defined frequency. Each transmission from the WCM 704 could include data such as Module ID (e.g., ID respective to the Wireless Emergency Module, System ID (e.g., ID respective to the unique Cargo Emergency Station). Frame Counter (e.g., prevents frozen data and inhibits data frame hacking), and/or Payload (e.g., data relating to E-Stop Functional Status). The CCS 702 is configured to issue an emergency fault if a paired WCM missed transmission frequency threshold, paired WCM no longer Communicating, a paired WCM transmits incorrect or unexpected module ID, a paired WCM transmits incorrect or unexpected payload information, a paired WCM transmits incorrect or unexpected frame counter, CES transmits incorrect or unexpected information, and/or the CES is no longer communicating.

In summary of above systems, both the wireless cargo control loop and the wireless emergency system loop should be healthy and regularly communicating together for wireless cargo control operations to exist within the cargo environment. These two systems functions are intended to exist on independent processing units with their own respective software and sub circuitry. It is possible for a system to include a Wireless Emergency System as add on safety functionality without a wireless control system if desired.

In various embodiments, the wireless emergency stop system 500 and the wireless control system 700 may both be on the same network. In this architecture, the wireless emergency stop system 500 receives the wireless control system 700 transmission and monitors for wireless control devices. If an emergency signal is present, or if a wireless control device misses transmission window frequency, the wireless emergency stop system 500 can remove power form the power drive system 506.

Figure 9:
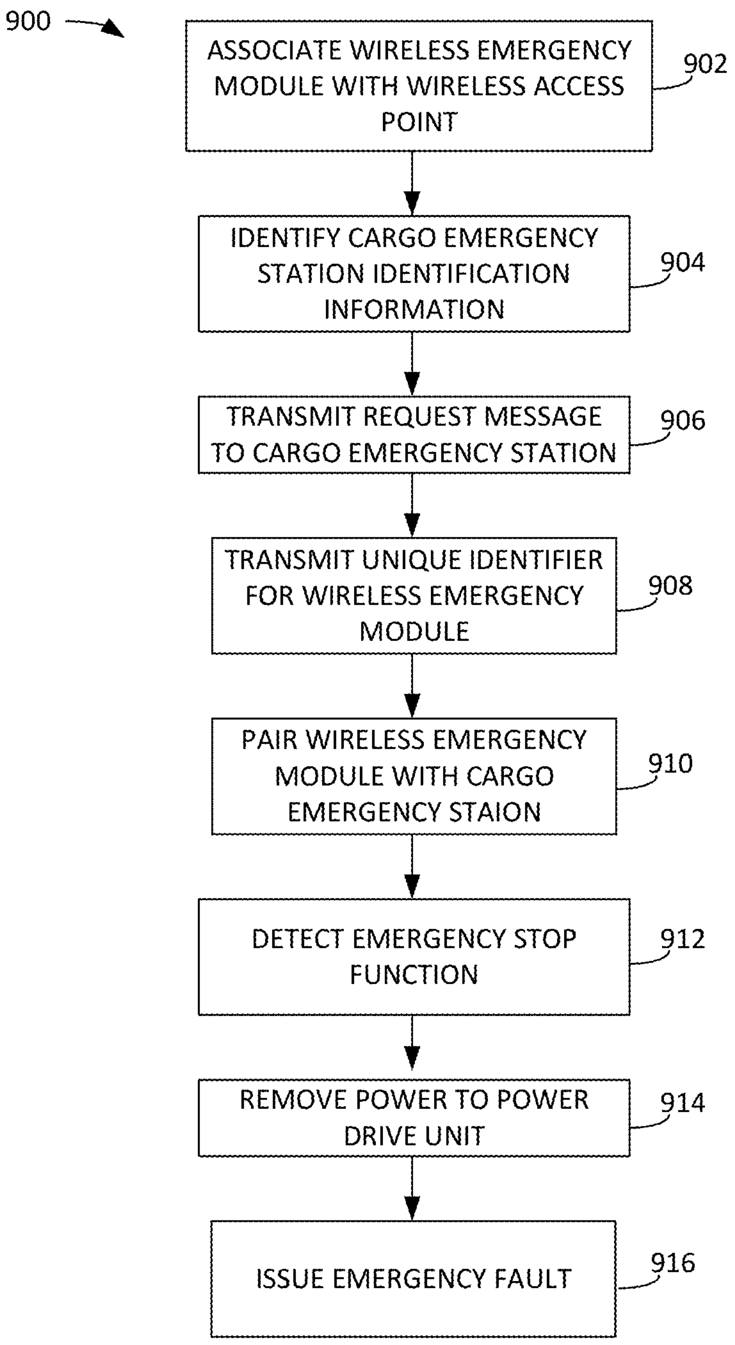
FIG. 9 illustrates a method of operating a wireless emergency stop system, in accordance with various embodiments.

Referring now to FIG. 9, a method 900 of operating a wireless emergency stop system is illustrated. At 902, a wireless emergency module is associated with a wireless access point of a network of a cargo handling system. At 904, a cargo emergency station identification information broadcasted over the network is identified. At 906, a request message to a cargo emergency station associated with the cargo emergency station identification information is transmitted. At 908, a unique identifier, via the cargo emergency station, for the wireless emergency module is transmitted. Thus, at 910, the wireless emergency module and an associated cargo emergency station are paired. Further, at 912, an emergency stop function administered by an operator may be detected. At 914, power to a power drive unit is removed in response to the emergency stop function detected. The emergency stop function may be administered by engaging an e-stop button on a wireless controller. In various embodiments, at 916, an emergency fault may be issued if the paired wireless emergency module is no longer communicating with the cargo emergency station.

Any feature of any other various aspects addressed in this disclosure that is intended to be limited to a "singular" context or the like will be clearly set forth herein by terms such as "only," "single," "limited to," or the like. Merely introducing a feature in accordance with commonly accepted antecedent basis practice does not limit the corresponding feature to the singular. Moreover, any failure to use phrases such as "at least one" also does not limit the corresponding feature to the singular. Use of the phrase "at least substantially," "at least generally," or the like in relation to a particular feature encompasses the corresponding characteristic and insubstantial variations thereof (e.g., indicating that a surface is at least substantially or at least generally flat encompasses the surface actually being flat and insubstantial variations thereof). Finally, a reference of a feature in conjunction with the phrase "in one embodiment" does not limit the use of the feature to a single embodiment.

The foregoing description has been presented for purposes of illustration and description. Furthermore, the description is not intended to limit the invention to the form disclosed herein. Consequently, variations and modifications commensurate with the above teachings, and skill and knowledge of the relevant art, are within the scope of the present disclosure. Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A cargo handling system for an aircraft, comprising:

a wireless emergency module (WEM), wherein the WEM is a portable device configured to wirelessly send an emergency stop signal;

a wireless cargo emergency stop system electro-mechanically coupled to the aircraft and configured to wirelessly receive the emergency stop signal;

a power relay communicatively coupled to the wireless cargo emergency stop system;

a power drive unit communicatively coupled to the power relay and the wireless cargo emergency stop system, such that power to the power drive unit is removed in response to an emergency stop activated via the wireless cargo emergency stop system; and a hard-wired emergency stop system communicatively coupled to the power relay and the power drive unit and comprising a control panel.

2. The cargo handling system of claim 1, wherein the wireless cargo emergency stop system and the hard-wired emergency stop system are connected in series such that the hard-wired emergency stop system or the wireless cargo emergency stop system directly induces the emergency stop that removes the power from the power drive unit, wherein in response to power being removed from the power drive unit, the control panel maintains power.

3. The cargo handling system of claim 1, wherein the wireless cargo emergency stop system comprises a cargo emergency station.

4. The cargo handling system of claim 3, wherein the cargo emergency station comprises at least one electrical relay configured to remove power from the power drive unit.

5. The cargo handling system of claim 3, wherein the cargo emergency station comprises at least one processor, interface for wireless communication, serial interface, indicators configured to display system statuses, or controls configured for interfacing between an operator and emergency functions.

6. The cargo handling system of claim 3, wherein the cargo emergency station and the wireless emergency module are configured to communicate wirelessly.

7. The cargo handling system of claim 3, wherein the wireless emergency module is a remote control comprising an E-stop button configured to receive a force from an operator to activate the emergency stop.

8. The cargo handling system of claim 3, wherein the wireless emergency module comprises at least one processor, interface for wireless communication, serial interface, or indicators configured to display system statuses.

9. An aircraft comprising:

a cargo deck with a cargo handling system, the cargo handling system comprising:

a wireless cargo emergency stop system; and a wireless cargo control system integrated with the wireless cargo emergency stop system, wherein the wireless cargo control system and the wireless cargo emergency stop system are configured in series with a hard-wired emergency stop system and a power relay system configured to distribute electrical drive power to a cargo power drive system, such that the wireless cargo control system, the wireless cargo emergency stop system, and the hard-wired emergency stop system are configured to communicate an emergency stop to remove the electrical drive power to the cargo power drive system.

10. The cargo handling system of claim 9, wherein the wireless cargo control system comprises a cargo control station configured to translate information from a paired wireless control module to an internal serial network of the cargo handling system.

11. The cargo handling system of claim 10, wherein the wireless cargo emergency stop system comprises a cargo emergency station and a wireless emergency module.

12. The cargo handling system of claim 11, wherein the wireless emergency module is authenticated with the emergency stop communication via a unique identification number thereby forming a communication path between a wireless control module of the wireless cargo control system and the wireless emergency module.

13. The cargo handling system of claim 12, wherein the wireless control module is configured to lose power to its circuit and thus lose communication with the wireless cargo control system in response to the emergency stop communication, thus terminating power to the cargo power drive system.

* * * * *